Patented Oct. 8, 1929

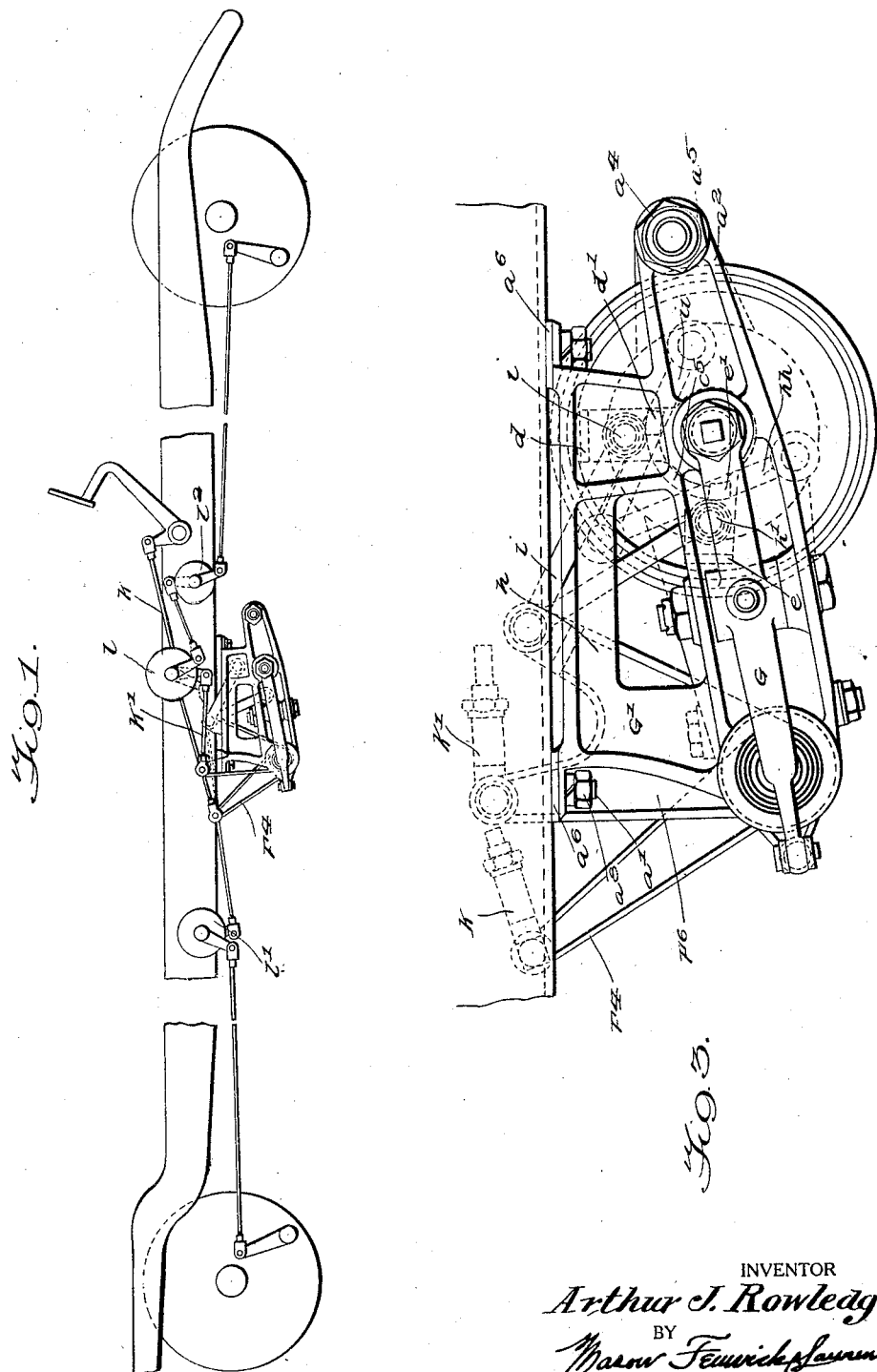

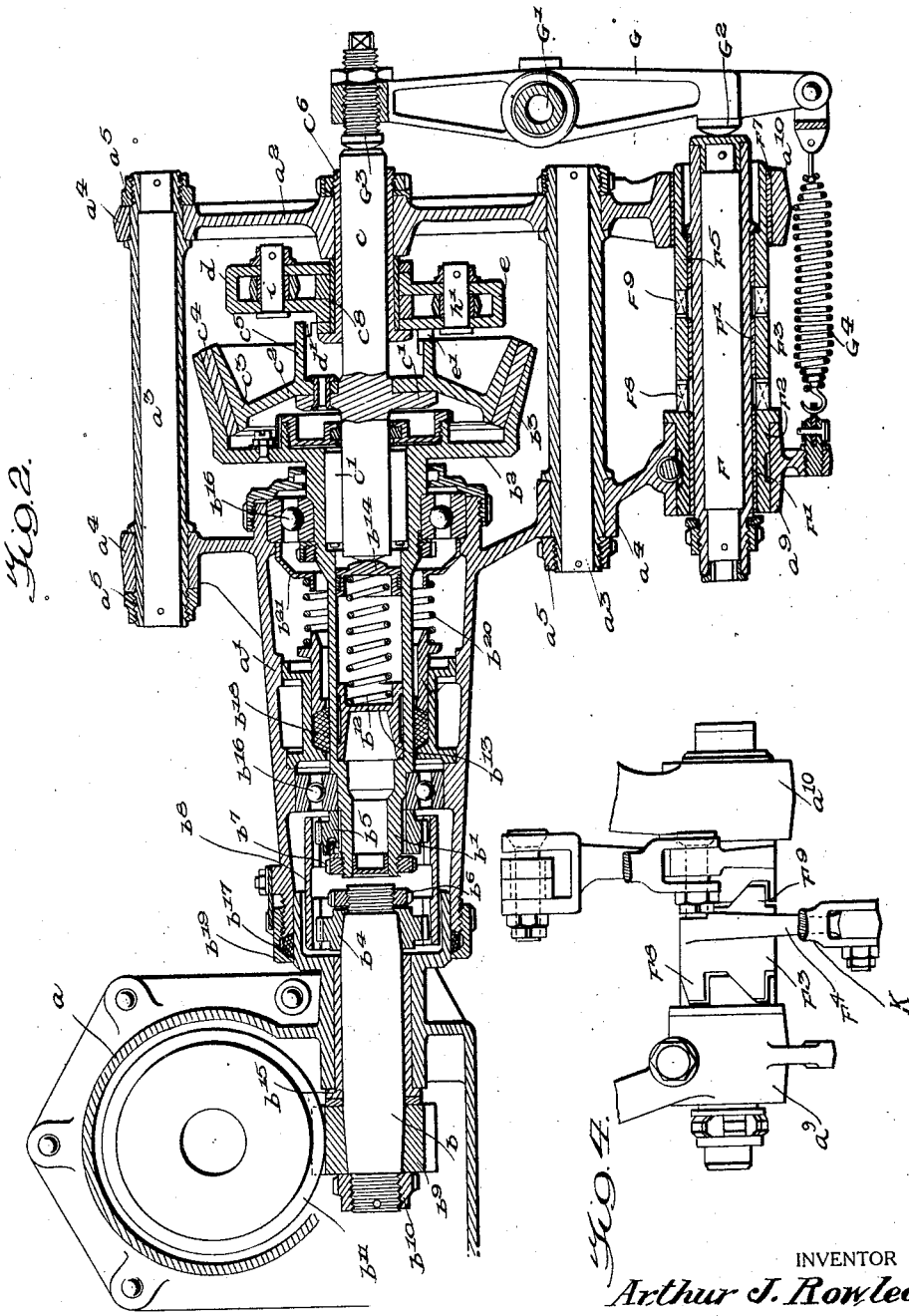

1,731,177

UNITED STATES PATENT OFFICE

ARTHUR JOHN ROWLEDGE, OF ELLERSLIE, ENGLAND, ASSIGNOR TO ROLLS-ROYCE LIMITED, OF DERBY, ENGLAND

BRAKE FOR VEHICLES

Application filed January 13, 1925, Serial No. 2,192, and in Great Britain February 11, 1924.

This invention has reference to brake systems for vehicles in which the moving of the vehicle is made to operate in applying force to the brakes to the relief of the force exerted by the driver the mechanism effecting this being commonly called a servo.

In such systems the servo mechanism generally consists of a shaft in permanent gear with road wheels and therefore constantly rotating when the car is moving, a friction clutch or brake one member of which is rigidly mounted on the said shaft and the other is in mechanical connection with the brakes, and a control mechanism in operable connection with the clutch which (operating through the clutch mechanism) puts on the brakes in such a manner that (while the clutch is always slipping) the constantly rotating shaft, through the instrumentality of the clutch, is adding force to that supplied by the driver to the brakes.

In such systems heretofore in vogue the servo is not available when the car is running backwards.

The object of this invention is to make a brake system of the kind in question, but such that the servo is operable when the car is running backwards, and also to effect improvements in the control mechanism.

According to this invention the driven member of the clutch is directly or indirectly geared to the brake mechanism so that which ever way it is rotated when the clutch is closed it operates the brakes. To effect the said result I arrange that a member in operable connection with the brakes is operated by a rocking member through two one-way drive devices one of which is effective when the rocking member is rotated in one direction and the other when it is rotated in the reverse direction.

I arrange that the movement of a lever operated by the pedal shall directly apply the brakes and at the same time (through the instrumentality of a thread or cam or other device) cause an axial movement of a member which closes the clutch.

In the preferred form of my invention two levers projected from bosses one of which is operably connected to the brakes (hereinafter called the "brake lever") and the other of which is connected to the pedal actuated by the driver (hereinafter called "the control lever"), are co-axially mounted, and are engaged so that when the control lever is rotated through an arc, it carries with it the brake lever, and at the same time causes the two levers to separate axially, which latter movement closes the clutch, and two other levers each projected from a hub are loosely mounted co-axially and a stop fixed to the driven member of the clutch engages and rotates through an arc one or other of the levers according to the direction the driven member is rotated, the free ends of such levers being operably connected to brakes. The result of such arrangement is that when the driver actuates the pedal lever brakes are directly operated and also the clutch is closed and no matter which way the car is travelling the servo mechanism assists in applying the brakes.

In the accompanying drawings an example of this invention is illustrated.

Fig. 1 is a side elevation of a chassis with the nearer side member removed. Fig. 2 a section on line 2—2, Fig. 3, of the servo mechanism the servo clutch being shown in engagement, Fig. 3 an end elevation of same in direction of arrow, and Fig. 4 a fragmentary elevation of the servo engaging mechanism shown in section in Fig. 2.

$a$ is a part of the gear box, $a^1$ and $a^2$ are two castings. The part $a$ has an extended cylindrical end which is secured into the casting $a^1$ and castings $a^1$ and $a^2$ are fastened together by shouldered columns $a^3$ with threaded ends which pass through perforated bosses $a^4$ and are secured by nuts $a^5$. The casting $a^2$ is provided with feet $a^6$ and is secured to a part of the chassis frame by bolts and nuts $a^7$ and $a^8$. $a^9$ and $a^{10}$ are perforated bosses extending from casting $a^2$ to support a shaft and other members hereinafter described. $b$ and $b^1$ are two sections of a shaft constantly rotating when the car is moving, the section $b^1$ having formed thereon the flange $b^2$ and the outer member of the cone clutch $b^3$, and the two sections $b$ and $b^1$ being secured together rotatively by means of the annular externally serrated members $b^4$ and $b^5$ mounted on them respectively and secured from rotation by keys, and fixed axially thereon by nuts $b^6$ and $b^7$, and the internally axially serrated sleeve $b^8$. $b^9$ is a worm wheel rigidly mounted on the section $b$ and secured by the nut $b^{10}$, which engages the worm wheel $b^{11}$ on the transmission shaft; $b^{12}$ is a spiral spring seating at one end on member $b^{13}$ resting against a shoulder of section $b^1$ and at the other on the sliding member $b^{14}$ which impinges on the driven shaft for purposes hereinafter described. $b^{15}$ is a bearing bush in which section $b$ rotates and $b^{16}$ are two ball bearings in which section $b^1$ rotates. $b^{17}$ and $b^{18}$ are packing glands to stop creeping oil from the gear box, in the case of $b^{17}$ the compression being maintained by nut $b^{19}$, and in the case of $b^{18}$ by a spiral spring $b^{20}$ seating on a sliding member of the packing gland and the annular member $b^{21}$. $c$ is the driven shaft of the clutch having formed thereon the flange $c^1$, to which there is riveted the annular member $c^2$ comprising the inner part of the cone clutch $c^3$ with the friction material $c^4$. On the member $c^2$ there is formed a rocker member $c^5$ which viewed end-on (see Fig. 3) is in shape part of a circle. This rocker member extends further at some parts than at the others (see Fig. 2) for purposes hereinafter appearing. In Fig. 2 the extended portions of this rocker member are not shown in their correct relative positions for convenience of illustration. $c^6$ is a bearing bush mounted rigidly in a boss of casting $a^2$, and $c^7$ a Hyatt flexible roller bearing, for the driven shaft of the clutch. $d$ and $e$ are two one-way driving arms or devices projected from hubs mounted on the bearing bush $c^6$ with an intervening bearing bush $c^8$ which also acts as a spacer. The hubs of these one-way driving arms or devices are free to rotate on the bush. The hubs are made to interlock axially for convenience. These one-way driving arms or devices are shown spread out in Fig. 2 for convenience, but are in their correct relative positions in Fig. 3. From each of these arms or devices is a projected stop $d^1$ and $e^1$. The rocker member $c^5$ lies between these two stops (see Fig. 3) the deeper end of the rocker member $c^5$ engaging the stop $d^1$ which is farther from the member $c^2$, and the shallower end the stop $e^1$. $f$ is a hollow shaft capable of moving axially from its normal position to the right and back to normal. $f^1$ are bearing bushes, $f^2$ is a sleeve, $f^3$ is a hub from which lever $f^4$ is projected free to rotate on the shaft $f$. $f^5$ is a hub from which lever $f^6$ is projected free to rotate on shaft $f$ and within bearing bush $f^7$. This lever $f^6$ has two arms one of which is operably connected to the brakes and the other to the servo. $f^8$ are sloping cams formed on the faces of sleeve $f^2$ and hub $f^3$. $f^9$ are like cams formed on the faces of hubs $f^3$ and $f^5$.

If hub $f^3$ is rotated through an arc, owing to the action of the cams $f^8$ and $f^9$, the three members, the sleeve $f^2$, the hub $f^3$, and the hub $f^5$, will separate axially, and the sleeve $f^2$ being fixed the hubs $f^3$ and $f^5$ will move to the right. At the same time the hub $f^3$ will cause the hub $f^5$ to rotate with it and the more it rotates, the more the axial movement of shaft $f$ is prevented. $g$ is a lever fulcrumed on pin $g^1$ with spherical projections $g^2$ and $g^3$ impinging on the ends of the shafts $f$ and $c$, the spherical projection $g^3$ having an adjusting device. $g^4$ is a spring returning the lever $g$ to normal position when not actuated. $h$ and $i$ are two connecting rods respectively hinged at one end on the pivots $h^1$ and $i^1$ and at the other end both pivoted to lever $f^6$. Normally the levers $f^4$ and $f^6$ and the connecting rods $h$ and $i$ are as shown in Fig. 3 by their respective reference letters. If the clutch member $c^2$ is rotated (say clockwise) the rocker member $c^5$ will engage the stop $d^1$ and carry arm or device $d$ round with it, and such arm or device will pull the connecting rod $i$ into say, position shown at $ii$, and pull the lever $f^6$. Thereupon the connecting rod $h$ will assume position as at $hh$ and lever $e$ (its hub being free to rotate) a corresponding position to that of lever $d$ the lever $f^6$ pushing them. If the clutch member $c^2$ had been rotated anti-clockwise the same movement would have taken place but the other arm or device and connecting rod would be the effecting agent. $k$ is the cable or rod pulled by the pedal, $k^1$ is a rod connecting lever $f^6$ with the distributing device $l$ which distributes the braking force between the front and back wheels through the equalizing devices $l^1$ and $l^2$.

The functioning of the mechanism above described is as follows:—

On the driver depressing the pedal the control lever is actuated, and thereupon two movements take place; that is to say, the brake lever is operated under the force exercised by the driver and the shaft $f$ is moved axially to the right, whereupon, through the lever $g$, the clutch is closed. Upon the clutch being closed the torque of the shafts $b$ and $b^1$ is communicated to the driven member $c$ which rotates through an arc carrying with it rocking member $c^2$ one of the one-way driving arms or devices $d$ or $e$ and pulling in contact with one of the connecting rods $h$ or $i$ and the operating lever $f^6$.

As soon as the wheel brakes are in contact the lever $f^6$ will come to rest and then the torque of the members $b$ and $b^1$ continues (the clutch always slipping) to exert pressure on lever $f^6$ in aid of the driver's effort.

What I claim is:—

1. In a brake system for an automobile, the combination with a member geared for rotation by the road wheels of the automobile; of a member mounted to rock about a fixed axis, a friction clutch to transmit torque from the first member to said rocking member, and brake actuating means interposed between said rocking member and the automobile brakes and including two one-way driving devices, a lever pivotally connected to each of said driving devices, and means connected to said rocking member and adapted operably to engage one or the other of the said devices according to the direction in which said member is rocked.

2. In a brake system for an automobile, the combination with a shaft, geared to the road wheels of said automobile, of a clutch element connected to said shaft to be rotated in either direction thereby, a second shaft mounted to rotate and slide co-axially with said clutch element and having fixed thereto a second clutch element slidable therewith into and out of engagement with first named clutch element, means to slide said second shaft to cause engagement of said elements, a rocker member fixed to said second clutch element, two one-way driving arms pivoted on the said second shaft and positioned to be rotated by said rocker member when one or the other arms is engaged by said rocker member according to the direction in which it is rocked, a connecting rod pivoted at one end to the free end of one of said arms, a second connecting rod pivoted at one end to the free end of the other arm, and means pivotally connecting the free ends of said connecting rods with the automobile brakes to apply the latter when desired.

3. A brake system for automobiles as set forth in claim 2 in which the means for sliding the second shaft includes alined spaced apart bearings, a sleeve fixed in one of said bearings, a second sleeve slidable in the other bearing and provided with an internal shoulder, a counter shaft slidable in said sleeves and having a shoulder in engagement with the shoulder of the second sleeve, a lever having a hub rotatably mounted on said counter shaft between said sleeves and provided with cam faces on opposite ends thereof, the opposed ends of said sleeves being provided with cam faces in contact and cooperating with those on said hub, operable means for rotating said lever on said counter shaft, a bifurcated arm extending perpendicularly from said hub, means operably connecting the free end of one furcation of said bifurcated arm to the brake rods of the system, said connecting rods being pivotally connected at their free ends to the other furcation of said bifurcated arm, a rocker lever pivoted intermediate its ends and having one of said ends contacting with the end of said counter shaft and its other end contacting with the end of said second shaft.

4. A brake system as set forth in claim 1 in which the clutch element includes a driving shaft comprising two aligned shaft sections and means for flexibily connecting said sections for rotation together.

In witness whereof I have signed this specification.

ARTHUR JOHN ROWLEDGE.